(12) United States Patent
Guo et al.

(10) Patent No.: US 10,629,116 B2
(45) Date of Patent: Apr. 21, 2020

(54) DISPLAY DEVICE AND DISPLAY METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 366 days.

(21) Appl. No.: 15/025,705

(22) PCT Filed: Sep. 8, 2015

(86) PCT No.: PCT/CN2015/089143
§ 371 (c)(1),
(2) Date: Mar. 29, 2016

(87) PCT Pub. No.: WO2016/145799
PCT Pub. Date: Sep. 22, 2016

(65) Prior Publication Data
US 2016/0277722 A1    Sep. 22, 2016

(30) Foreign Application Priority Data
Mar. 17, 2015  (CN) .......................... 2015 1 0117961

(51) Int. Cl.
G09G 3/3225    (2016.01)
G09G 3/36      (2006.01)
(Continued)

(52) U.S. Cl.
CPC .............. *G09G 3/3225* (2013.01); *G09G 3/20* (2013.01); *G09G 3/3648* (2013.01);
(Continued)

(58) Field of Classification Search
CPC ............... G09G 3/3225; G09G 3/3648; G09G 2300/0465; G09G 2320/0209; H04N 13/0409; H04N 13/0422
See application file for complete search history.

(56) References Cited

U.S. PATENT DOCUMENTS

2011/0228185 A1* 9/2011 Hamagishi ......... G02B 27/2214
                                                    349/15
2013/0044372 A1  2/2013 Lo
(Continued)

FOREIGN PATENT DOCUMENTS

CM    104680949 A    6/2015
CN    102193244 A    9/2011
(Continued)

OTHER PUBLICATIONS

English Translation of CN 103389597.*
English Translation of CN 103185995.*
English Translation of CN 104299561.*
Chinese Office Action dated Oct. 17, 2016.
Search Report and Written Opinion dated Dec. 23, 2015 from State Intellectual Property Office of the P.R. China.
(Continued)

*Primary Examiner* — Patrick N Edouard
*Assistant Examiner* — Eboni N Giles
(74) *Attorney, Agent, or Firm* — Dilworth & Barrese, LLP; Michael J. Musella, Esq.

(57) ABSTRACT

A display device and its display method are provided. The display device includes a pixel array and a grating; the pixel array includes a plurality of columns of pixels with each pixel comprising at least two sub-pixels; each column of sub-pixels is formed by cyclically arranged sub-pixels of at least three colors, and an amount of sub-pixels in each column of sub-pixels are the same and a size of each sub-pixel is the same; an upper edge of each sub-pixel in an
(Continued)

|     |     | S1 | S2 | S3 | S4 | S5 | S6 | S7 | S8 | S9 | S10 |
|-----|-----|----|----|----|----|----|----|----|----|----|-----|
| C1  | R1  | B1 | G2 | B1 | G2 | B1 | G2 | B1 | G2 | B1 | G2  |
| C2  | R2  | G1 | R2 | G1 | R2 | G1 | R2 | G1 | R2 | G1 | R2  |
| C3  | R3  | R1 | B2 | R1 | B2 | R1 | B2 | R1 | B2 | R1 | B2  |
| C4  | R4  | B1 | G2 | B1 | G2 | B1 | G2 | B1 | G2 | B1 | G2  |
| C5  | R5  | G1 | R2 | G1 | R2 | G1 | R2 | G1 | R2 | G1 | R2  |
| C6  | R6  | R1 | B2 | R1 | B2 | R1 | B2 | R1 | B2 | R1 | B2  |
| C7  | R7  | B1 | G2 | B1 | G2 | B1 | G2 | B1 | G2 | B1 | G2  |
| C8  | R8  | G1 | R2 | G1 | R2 | G1 | R2 | G1 | R2 | G1 | R2  |
| C9  | R9  | R1 | B2 | R1 | B2 | R1 | B2 | R1 | B2 | R1 | B2  |
| C10 | R10 | B1 | G2 | B1 | G2 | B1 | G2 | B1 | G2 | B1 | G2  |
| C11 | R11 | G1 | R2 | G1 | R2 | G1 | R2 | G1 | R2 | G1 | R2  |
| C12 | R12 | R1 | B2 | R1 | B2 | R1 | B2 | R1 | B2 | R1 | B2  | odd column is aligned with that of a sub-pixel in another odd column and an upper edge of each sub-pixels in an even column is aligned with that of a sub-pixel in another even column, and a pre-set length of longitudinal offset is provided between sub-pixels in odd columns and sub-pixels in even columns; colors of any adjacent sub-pixels are different from each other; light-blocking areas of the grating blocks a partial area of the pixel array. Upon an image being displayed by the pixel array, one sub-pixel can borrow its adjacent sub-pixels or be borrowed by its adjacent sub-pixel so as to allow a display resolution to be greater than a physical resolution to increase PPI of a display device.

14 Claims, 4 Drawing Sheets

(51) Int. Cl.
 *H04N 13/324* (2018.01)
 *H04N 13/31* (2018.01)
 *G09G 3/20* (2006.01)
(52) U.S. Cl.
 CPC ........... *H04N 13/31* (2018.05); *H04N 13/324* (2018.05); *G09G 2300/0452* (2013.01); *G09G 2300/0465* (2013.01); *G09G 2320/0209* (2013.01); *G09G 2360/16* (2013.01)

(56) References Cited

U.S. PATENT DOCUMENTS

| 2015/0170561 A1* | 6/2015 | Ahn | G09G 3/2022 |
| | | | 345/691 |
| 2016/0232829 A1* | 8/2016 | Ahn | G09G 3/2003 |
| 2016/0379533 A1 | 12/2016 | Guo et al. | |

FOREIGN PATENT DOCUMENTS

| CN | 103185995 A | 7/2013 |
| CN | 103389597 A | 11/2013 |
| CN | 103777393 A | 5/2014 |
| CN | 103926698 A | 7/2014 |
| CN | 104299561 A | 1/2015 |
| CN | 104570370 A | 4/2015 |
| CN | 104599626 A | 5/2015 |
| CN | 104656263 A | 5/2015 |
| CN | 104766548 A | 7/2015 |
| JP | 2001136375 A | 5/2001 |
| JP | 2014053653 A | 3/2014 |
| WO | 2012026391 A | 3/2012 |

OTHER PUBLICATIONS

Second Chinese Office Action dated Mar. 21, 2017.
European Search Report dated Jul. 12, 2018.

* cited by examiner

DISPLAY DEVICE AND DISPLAY METHOD

TECHNICAL FIELD

At least one embodiment of the present disclosure pertains to a display device and a display method.

BACKGROUND

To boost visual experience of a user, more and more display devices can achieve 3D (Three dimensions) display so as to make pictures projected to eyes of a user present 3D display effect.

Generally, a display device to achieve 3D display effect includes a grating and a pixel array. Each pixel in a pixel array includes three sub-pixels, and each column of sub-pixels is usually composed of sub-pixels with three colors including red sub-pixels, green sub-pixels or blue sub-pixels that are aligned. Quantities of sub-pixels included in each column are the same and the lateral height of sub-pixels is consistent. The grating includes light-blocking areas and transparent areas that are arranged alternately and the light-blocking areas partially blocking the pixel array.

Upon an image being displayed in a display device above, a brightness value of each sub-pixel in a pixel array is determined first according to an image to be displayed; and then, the image is displayed according to the brightness value of each sub-pixel in a pixel array and the image to be displayed is divided into a left view and a right view via the grating.

SUMMARY

To increase pixel-per-inch (PPI) of a display device so as to improve 3D display effect, the embodiments of the present disclosure provide a display device and a display method.

At least one of the embodiments in the present disclosure provides a display device that comprises at least a pixel array and a grating; the pixel array comprises a plurality of columns of pixels with each pixel comprising at least two sub-pixels; each column of sub-pixels is formed by cyclically arranged sub-pixels of at least three colors, an amount of sub-pixels comprised in each column of sub-pixels is the same and a size of each sub-pixel is the same; an upper edge of each sub-pixel in an odd column is aligned with that of a sub-pixel in another odd column, an upper edge of each sub-pixel in an even column is aligned with that of a sub-pixel in another even column, and a preset length of longitudinal offset between sub-pixels in odd columns and sub-pixels in even columns is provided, with the preset length being less than a longitudinal length of a sub-pixel; colors of any adjacent sub-pixels are different from each other; the grating comprises light-blocking areas and transparent areas that are arranged alternately, with the light-blocking areas blocking a partial area of the pixel array.

For example, each of the pixels includes two sub-pixels. Also for example, the sub-pixels in each column are formed by cyclic arrangement of a red sub-pixel, a green sub-pixel and a blue sub-pixel. For example, the preset length of longitudinal offset between sub-pixels of an odd column and sub-pixels of an even column is a half of a longitudinal length of one sub-pixel.

For example, the light-blocking areas and the transparent areas of the grating are distributed in a vertical bar configuration.

For example, a light-blocking area blocks a left-half part of the odd column sub-pixels and a right-half part of the even column sub-pixels; or, a light-blocking area blocks a right-half part of the odd column sub-pixels and a left-half part of the even column sub-pixels.

For example, a ratio of a lateral length with respect to a longitudinal length in each sub-pixel is within 1:1 to 2:1. For example, the ratio of a lateral length with respect to a longitudinal length in each sub-pixel is 2:1.

A display method is provided in at least one of the embodiments of the present disclosure, and the method can be employed in the above display device. The display method includes: determining an original brightness of each sub-pixel in a pixel array according to an image to be displayed; obtaining a sampling area of each sub-pixel; for any one sub-pixel, calculating a target brightness value of the any one sub-pixel according to an original brightness value of the any one pixel and an original brightness value of each sub-pixel in a sampling area of the any one sub-pixel; and displaying the image according to a target brightness value of each sub-pixel in the pixel array and dividing the displayed image via a grating into a plurality of views.

For example, a sampling area of the any one sub-pixel is in a symmetrical structure.

For example, a sampling area of the any one sub-pixel is a diamond sampling area and a center point of the diamond sampling area overlaps a center point of the any one sub-pixel; four vertexes of the diamond sampling area are respectively center points of sub-pixels meeting requirements and the sub-pixels meeting requirements are those on a same row or column as the any one sub-pixel and having a same color as the any one sub-pixel.

For example, the sampling area of the any one sub-pixel is a rectangular sampling area, a center point of the rectangular sampling area overlaps a center point of the any one sub-pixel, and four vertexes of the rectangular sampling area respectively are midpoints of each side of a pre-set diamond; a center point of the preset diamond overlaps the center point of the sub-pixel and the four vertexes of the preset diamond are center points of sub-pixels meeting requirements, and the sub-pixels are those sub-pixels on a same row or column as the any one sub-pixel and having a same color as that of the any one sub-pixel.

For example, the sub-pixels meeting requirements are those sub-pixels with a least distance to the any one sub-pixel in those sub-pixels that are on a same row or column as the any one sub-pixel and have a same color as the any one sub-pixel.

For example, calculating a target brightness value of the any one sub-pixel according to an original brightness value of the any one sub-pixel and an original brightness value of each sub-pixel in the sampling area of the any one sub-pixel, comprises: determining a weight of each sub-pixel that has a same color as that of the any one sub-pixel in the sampling area of the any one sub-pixel; and calculating the target brightness value of the any one sub-pixel according to the weight and the original brightness value of each sub-pixel that has a same color as that of the any one sub-pixel in the sampling area of the any one sub-pixel.

For example, the any one sub-pixel is not a periphery sub-pixel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and, it is not limitative to the scope of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The inventors has noted that, upon an image being displayed in a traditional 3D display device, because each column of sub-pixels in a pixel array are formed by alignment of sub-pixels of three colors including red, green or blue, and each sub-pixel consists of sub-pixels of three colors, the display resolution of a display device is the physical resolution of the display device. In addition, a displayed image is divided into a left view and a right view by a grating, and light-blocking areas can block a partial area of a pixel array, thus leading to an obvious decrease of PPI (Pixels Per Inch) of the display device. A high PPI can improve 3D display effect, thus, upon 3D display being carried out by the above display device, favorable 3D display effect can not be achieved.

At least one of the embodiments of the present disclosure provides a display device that includes at least a pixel array and a grating.

The pixel array includes a plurality of columns of pixels with each pixel comprising at least two sub-pixels; each column of sub-pixels comprises sub-pixels of at least three colors that are cyclically aligned, and amounts of sub-pixels included in all the column of sub-pixels are the same, with the sizes of the sub-pixels being the same; an upper edge of each sub-pixel in an odd column is aligned with that of a sub-pixel in another odd column, an upper edge of each sub-pixel in an even column is aligned with that of a sub-pixel in another even column, and a preset length of longitudinal offset is provided between sub-pixels of an odd column and sub-pixels of an even column, with the preset length being less than a longitudinal length of a sub-pixel; colors of any adjacent sub-pixels are different from one another; the grating includes light-blocking areas and transparent areas that are arranged alternately with each other, with the light-blocking areas blocking a partial area of the pixel array.

The amounts of pixel columns specifically included in a pixel array are not limited in the embodiment of the present disclosure. In embodiments of the present disclosure, the numbers of pixel columns can be determined in combination with the size of a screen, the physical resolution of a display device and the size of each sub-pixel. For example, a pixel array can include ten pixel columns or twelve pixel columns, etc. The quantity of pixels included in each pixel column is also not limited in the embodiment of the present disclosure. For example, each pixel column includes eleven pixels or thirteen pixels, etc.

Whatever quantity of pixels included in a pixel column, each pixel can include at least two sub-pixels, for example, a pixel may include two sub-pixels or three sub-pixels, etc, and the embodiment of the present disclosure will not be limited by the quantity of sub-pixels included in a pixel. Further, because a pixel array includes a plurality of pixel columns and each pixel includes at least two sub-pixels, the pixel array includes a plurality of column of sub-pixels. In addition, the sizes of the sub-pixels being the same refers to that all the sub-pixels have the same lateral length and longitudinal length.

Each sub-pixel in a pixel array can independently give out light with color in need. A sub-pixel is usually controlled via a thin film transistor, for example, each sub-pixel corresponds to at least one thin film transistor. Thin film transistors are arranged in array and controlled by gate lines and data lines.

In some embodiments, the display device can be an OLED (Organic Light-emitting Diode). For example, each sub-pixel is provided with an OLED and each sub-pixel directly gives out light with color that is required via the OLED. For example, a red sub-pixel can give out red light via an OLED.

In addition, the display device can also be a liquid crystal display device, in which each sub-pixel includes a filter, and colors of light through filters correspond to the colors of the three kinds of sub-pixels. In particular, at the position of each sub-pixel, there is provided with a color filter that has a different color, through the color filter light can be converted into the corresponding color. The color of the color filter provided at the position of each sub-pixel is the same as the color of the sub-pixel. For example, the color filter provided at the position of a red sub-pixel is red, etc.

In the embodiment of the present disclosure, a pixel array can include sub-pixels of three colors, for example, red sub-pixels R, blue sub-pixels B and green sub-pixels G Of course, a pixel array can also include sub-pixels of four colors, for example, red sub-pixels R, blue sub-pixels B, green sub-pixels G and color-supplement sub-pixels such as white sub-pixels W. The embodiment of the present disclosure neither imposes any limitation onto the color varieties of sub-pixels nor imposes any limitation onto the specific color of color-supplement sub-pixels.

Arrangement of sub-pixels of each column in a pixel array provided in the embodiment of the present disclosure can be realized by cyclic arrangement of sub-pixels of various colors. Specifically, each column of sub-pixels is formed by cyclic arrangement of sub-pixels of at least three colors. For example, if in a pixel array, red sub-pixels R, blue sub-pixels B and green sub-pixels G are included, each column of sub-pixels can be formed by cyclic arrangement of a red sub-pixel R, a blue sub-pixel B and a green sub-pixel G.

To make sure that a pixel array is regularly structured, all the column of sub-pixels can include a same quantity of sub-pixels. For example, each sub-pixel can include twelve sub-pixels or fifteen sub-pixels, etc. In addition, in the embodiment of the present disclosure, by making each column of sub-pixels include a same quantity of sub-pixels, it is able to ensure each sub-pixel can borrow an adjacent sub-pixel, hence avoiding appearance of abnormal display of some sub-pixels due to being unable to borrow an adjacent sub-pixel of another color.

An upper edge of each sub-pixel in an odd column being aligned with that of a sub-pixel in another odd column refers to making all the sub-pixels of odd columns on a same row aligned with each other in a horizontal direction; an upper edge of each sub-pixel in an even column being aligned with that of a sub-pixel in another even column refers to making all sub-pixels of even columns on a same row aligned with each other in a horizontal direction. For example, sub-pixels of a first column on the first row are aligned with sub-pixels of a third column on the first row in a horizontal direction.

The preset length of longitudinal offset between sub-pixels of an odd column and sub-pixels of an even column can be one second or one third of a longitudinal length of a sub-pixel, etc, only if a longitudinal length of the preset length is less than a longitudinal length of a sub-pixel. For example, sub-pixels of any even column can be one second of a longitudinal length of a sub-pixel higher, in a longitudinal direction, than sub-pixels of any odd column.

In addition, the color of any sub-pixel is different from that of any adjacent sub-pixel. Specifically, the color of a sub-pixel is different from sub-pixels that are positioned on a left side, a right side, an upper side and a down side of the sub-pixel. To make sure that colors of any adjacent sub-pixels are different, the arrangement mode of sub-pixels in an odd column and that of sub-pixels in an even column are different from each other. Specifically, if each column of sub-pixels is formed by cyclic arrangement of a red sub-pixel, a green sub-pixel and a blue sub-pixel, the arrangement mode of sub-pixels of an odd column and that of sub-pixels of an even column can be the kinds as below:

The first mode: the arrangement mode of sub-pixels in an odd column can be B-G-R-B . . . , and the arrangement mode of sub-pixels in an even column can be G-R-B-G . . . .

The second mode: the arrangement mode of sub-pixels in an odd column can be B-R-G-B . . . , and the arrangement mode of sub-pixels in an even column can be R-G-B-R . . . .

The third mode: the arrangement mode of sub-pixels in an odd column can be G-B-R-G . . . , and the arrangement mode of sub-pixels in an even column can be B-R-G-B . . . .

The fourth mode: the arrangement mode of sub-pixels in an odd column can be G-R-B-G . . . , and the arrangement mode of sub-pixels in an even column can be R-B-G-R . . . .

The fifth mode: the arrangement mode of sub-pixels in an odd column can be R-B-G-R . . . , and the arrangement mode of sub-pixels in an even column can be B-G-R-B . . . .

The six mode: the arrangement mode of sub-pixels in an odd column can be R-G-B-R . . . , and the arrangement mode of sub-pixels in an even column can be G-B-R-G . . . .

Further, as for the width and amount of light-blocking areas and transparent areas on a grating, the embodiment of the present disclosure will not make any specific limitation thereto. To enable a displayed image to present 3D effect, light-blocking areas block a partial area in a pixel array to make a displayed image into a plurality of views, and the different views are projected to different eyes of a viewer so as to produce a 3D display effect. For example, a displayed image can be divided into a left view and a right view via the light-blocking areas and the transparent areas of a grating, whereby the left view is projected to a left eye of a viewer and the right view is projected to a right eye of the viewer, so as to make a displayed image present a 3D effect. The size of a specific area of a partial area mentioned above will not be limited specifically in the embodiment of the present disclosure and can be adjusted according to a user's position.

In a display device provided in at least one of embodiment of the present disclosure, each column of sub-pixels in a pixel array is formed by cyclic arrangement of sub-pixels of at least three colors, longitudinal offset between sub-pixels in an odd column and sub-pixels in an even column is provided with a preset length, and colors of any adjacent sub-pixels are configured to be different from each other, thus one sub-pixel forms a delta configuration with respect to another two adjacent sub-pixels in a same column Therefore, upon an image being displayed by a pixel array, a sub-pixel can borrow its adjacent sub-pixels and can also be borrowed by its adjacent sub-pixel(s) to provide three primary colors that can realize display in different colors, so as to make display resolution greater than physical resolution, which increases PPI of a display device, and hence improving 3D display effect.

Figure 1:
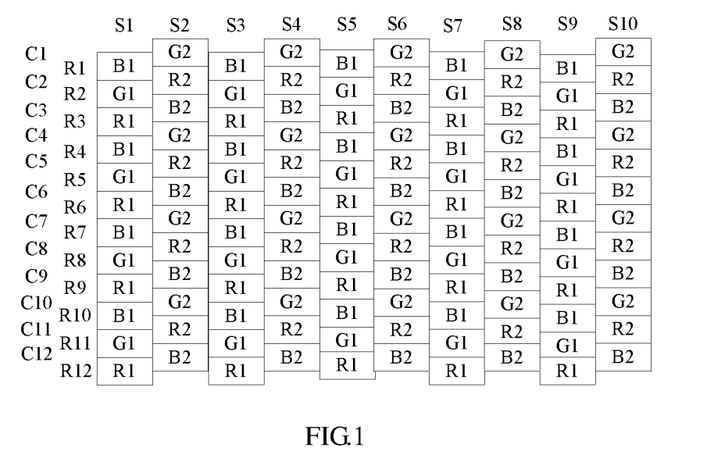
FIG. 1 is a schematic view for arrangement of a pixel array provided in an embodiment of the present disclosure.

FIG. 1 is a schematic view of a pixel array provided in an embodiment of the present disclosure. The pixel array is constituted of sub-pixels arranged in ten columns and each pixel comprises two sub-pixels; each column of sub-pixels is formed by cyclic arrangement of a red sub-pixel, a green sub-pixel and a blue sub-pixel; an odd column of sub-pixels in the pixel array refer to a first column, a third column, a fifth column, a seventh column and a ninth column of sub-pixels while an even column of sub-pixels in the pixel array refer to a second column, a fourth column, a sixth column, a eighth column and a tenth column of sub-pixels. Upper edges of all odd columns of sub-pixels are aligned with each other and upper edges of all even columns of sub-pixels are aligned with each other; in addition, a preset length of longitudinal offset between sub-pixels of an odd column and sub-pixels of an even column is configured to be a half of the longitudinal length of a sub-pixel. Colors of any adjacent sub-pixels in the pixel array are different from each other.

In FIG. 1, the arrangement mode of sub-pixels in an odd column is B-G-R-B . . . , and the arrangement mode of sub-pixels in an even column is G-R-B-G . . . . In addition, taking the green sub-pixel at a S2C4 position as an example, the color of the green sub-pixel is different from that of adjacent sub-pixels on an upper side, a down side, a left side and a right side of the green sub-pixel. Each sub-pixel, together with its adjacent sub-pixels of another two colors on a same column, forms a delta structure. Taking a blue sub-pixel at S1R1 position in FIG. 1 as an example, this blue sub-pixel, together with the green sub-pixel at S2C1 position and the red sub-pixel at S2C2 position, forms a delta structure.

It is to be noted in FIG. 1 and following figures that S in front of each number detonates a column of sub-pixels, R in front of each number detonates a row of sub-pixels in odd columns and C in front of each number detonates a row of sub-pixels in even columns A letter shown on each sub-pixel represents the color of the sub-pixel. For example, R is employed to represent a red sub-pixel, G is employed to represent a green sub-pixel and B is employed to represent a blue sub-pixel. For example, a sub-pixel at S2C1 position is a green sub-pixel. The letter "1" marked on a sub-pixel, as illustrated in figures, indicates that the sub-pixel is provided on an odd column while the letter "2" indicates that the sub-pixel is provided on an even column.

In another embodiment, the light-blocking areas and the transparent areas of a grating can be of a grid shape or a bar shape, etc. In the case of the light-blocking areas and the transparent areas of a grating being of different shapes, light can be controlled to be transmitted in different directions, so as to obtain different views via a grating. For example, the light-blocking areas and the transparent areas of a grating are of a vertical bar configuration in arrangement. If a grating with such a structure is employed to block a partial area of a pixel array, a display device can divide a displayed image into a left image and a right image and respectively controls the left image and the right image to enter into a left eye and a right eye of a viewer, so as to realize 3D display in two views. Manufacturing process of a 3D display solution in two views is simple and easy to be realized.

It is to be explained that a grating employed in an embodiment of the present disclosure can be used to divide an image displayed via sub-pixels in odd columns of the pixel array into a left view and an image displayed via sub-pixels in even columns of the pixel array into a right view, nevertheless, types of the grating are not limited. For example, the grating can be an active grating or a passive grating. In addition, the light-blocking areas of the grating can block sub-pixels in odd columns of the pixel array, at a certain angle as well, to project light of sub-pixels in odd columns of the pixel array to a left side to form a left view and project light of sub-pixels in even columns of the pixel array to a right side to form a right view. The light-blocking areas of the grating can also block sub-pixels in even columns of the pixel array at another angle, which still can project light of sub-pixels in odd columns of the pixel array to a left side to form a left view and project light of sub-pixels in even columns of the pixel array to a right side to form a right view. Of course, the light-blocking areas of the grating can also block a part area of sub-pixels in odd columns as well as a part area of sub-pixels in even columns of the pixel array to realize division between a left view and a right view in connection with a corresponding angle. The position blocked by the light-blocking areas of the grating will not be limited in the embodiment of the present disclosure.

Figure 2:
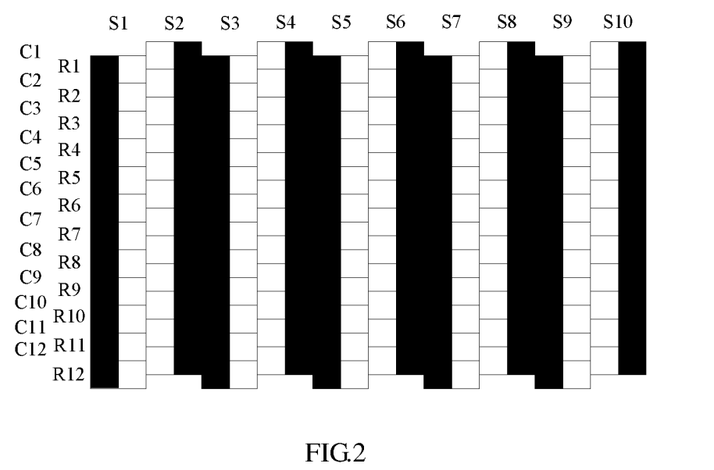
FIG. 2 is a schematic view for relationship of an pixel array with light-blocking areas provided in another embodiment of the present disclosure.

In another embodiment, to reduce crosstalk between views arriving a left eye and a right eye of a user so as to make a presented 3D image relatively harmonious, the partial area can be a half area in a pixel array. For example, the light-blocking areas of a grating can block, in a pixel array, a left-half area of sub-pixels in odd columns and a right-half area of sub-pixels in even columns. In this way, the transparent areas of a grating correspond to a right-half area of sub-pixels in odd columns and a left-half area of sub-pixels in even columns. For example, the light-blocking areas of a grating can block, in a pixel array, a right-half area of sub-pixels in odd columns and a left-half area of sub-pixels in even columns. In this way, the transparent areas of a grating correspond to a left-half area of sub-pixels in odd columns and a right-half area of sub-pixels in even columns. In a schematic view that illustrates a relationship of a pixel array and the light-blocking areas of a grating in FIG. 2, the light-blocking areas of the grating blocks a left-half area of sub-pixels in odd columns and a right-half area of sub-pixels in even columns in a pixel array.

In another embodiment, in configuring the size of each sub-pixel in a pixel array, it is able to control a proportional relationship of a lateral length with respect to a longitudinal length of each sub-pixel. Selectively, the ratio of a lateral length to a longitudinal length in each sub-pixel can be configured to be within 1:1 to 2:1. Still taking FIG. 1 as an example, in the embodiments of the present disclosure, the lateral direction refers to a left-right direction in FIG. 1 and a longitudinal direction refers to an up-down direction in FIG. 1. Taking the case that the ratio of a lateral direction to a longitudinal direction in each sub-pixel is configured to be 3:2 as an example, if a lateral length of each sub-pixel is configured to be three centimeters, a longitudinal length of each sub-pixel can be configured to be two centimeters.

In another embodiment, the ratio of the lateral direction to the longitudinal direction in each sub-pixel can be configured to be 2:1. For example, if the lateral length of each sub-pixel is configured to be two centimeters, the longitudinal length of the sub-pixel can be configured to be one centimeter. In a pixel array as illustrated in FIG. 1, the ratio of a lateral length to a longitudinal length in each sub-pixel is 2:1.

Whether to set a ratio of a lateral length to a longitudinal length of each sub-pixel to be within 1:1 to 2:1 or directly 2:1 can make sure that each sub-pixel has a relatively greater length in a lateral direction, so as to make manufacturing convenient. In addition, the ratio of the lateral length to the longitudinal length provided in the embodiment, in contrast to the case that the ratio of the lateral length to the longitudinal length of a sub-pixel is configured to be 1:1, can reduce numbers of sub-pixels in the lateral direction. In configuring a drive circuit for driving a pixel array, a sub-pixel in the lateral direction corresponds to a data line, and therefore, if numbers of sub-pixels in the lateral direction is reduced, quantities of data lines required for fabricating a pixel array can be reduced, which can further simplify a fabrication process.

The embodiments mentioned above can be combined in any way, which will not be specified herein.

A display device provided in the above embodiments of the present disclosure can be applied to a display method specified hereinafter, and description of respective embodiment specified hereinafter can be referred to for a display method of a display device.

At least one embodiment of the present disclosure provides a display method that can be applied for a display device provided in the above respective embodiment. The display device comprises at least a pixel array and a grating; the pixel array includes a plurality of columns of pixels with each pixel comprising at least two sub-pixels; each column of sub-pixels comprises sub-pixels of at least three colors that are cyclically arranged, and the number of sub-pixels included in each column is the same, with the size of each sub-pixel being the same; an upper edge of a sub-pixel in an odd column is aligned with that of a sub-pixel in another odd column, an upper edge of a sub-pixel in an even column is aligned with that of a sub-pixel in another even column, and a preset length of longitudinal offset between sub-pixels in odd columns and sub-pixels in even columns is provided, with the preset length being less than a longitudinal length of a sub-pixel; colors of any adjacent sub-pixels are different; a grating includes light-blocking areas and transparent areas that are spaced, with the light-blocking areas blocking a partial area of the pixel array.

Figure 3:
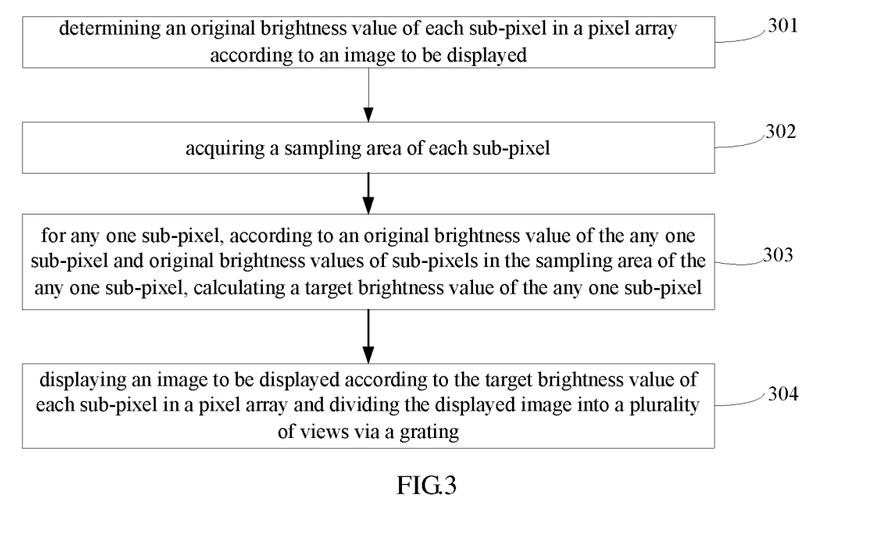
FIG. 3 is a flow diagram of a display method of a display device provided in another embodiment of the present disclosure.

As illustrated in FIG. 3, the display method include step 301: determining an original brightness value of each sub-pixel in a pixel array according to an image to be displayed.

In the embodiment of the present disclosure, an image to be displayed consists of a plurality of pixels and each pixel has a corresponding color. Upon the display device displaying an image to be displayed, each pixel of the image is mapped into respective sub-pixels in the pixel array, and the color of each pixel of the image is rendered according to the brightness value of the respective sub-pixels. To render the color of each pixel of the image to be displayed, the original brightness value of each sub-pixel should be determined according to the image to be displayed.

Specifically, a corresponding relationship, regarding the position of each pixel of an image to be displayed and the position of each pixel in the pixel array, can be established in advance. Then, for a sub-pixel in the pixel array, according to the color of the pixel at a position, corresponding to the sub-pixel, of the image to be displayed, an original brightness of the sub-pixel is determined.

A brightness value can be a value of one of three primary colors (namely, R, G, and B) to which a sub-pixel corresponds. For example, if a sub-pixel is a red sub-pixel, the original brightness value of the sub-pixel can be a red value of the pixel at a corresponding position of the image to be displayed.

Referring to FIG. 3 again, the display method further include step 302: acquiring a sampling area of each sub-pixel.

In the embodiment of the present disclosure, upon a display device displaying an image, a sub-pixel can borrow an original brightness value of another sub-pixel that has a same color as this sub-pixel in its sampling area to conduct display. For a sub-pixel, a sampling area is a preset area for this sub-pixel to borrow a brightness value or bright values.

The shape of a sampling area of any sub-pixel is not specifically limited in the embodiment of the present disclosure. For example, a sampling area of any sub-pixel can be of a symmetrical structure. A sampling area configured in a symmetrical structure is convenient for selecting the weight of each sub-pixel in the sampling area, and therefore, work to calculate a target brightness value of each sub-pixel can be reduced in calculation.

It is to be explained that, if a sub-pixel is a periphery sub-pixel with one side thereof being provided without an adjacent sub-pixel, a sampling area of the periphery sub-pixel can be configured in a non-symmetrical structure. For example, sub-pixels positioned on the first column (such as the green sub-pixels at S1R2 position in FIG. 1), sub-pixels positioned on the last column (such as the red sub-pixels at S10C11 position in FIG. 1), sub-pixels positioned on the first row (such as the green sub-pixel at S2C1 position in FIG. 1) and sub-pixels positioned on the last row (such as the red sub-pixel at S3R12 position in FIG. 1) are periphery sub-pixels, a sampling area of which can be configured in a non-symmetrical structure.

Of course, a sampling area of a periphery sub-pixel can also be configured in symmetrical structure. Nevertheless, if a sampling area of such a periphery sub-pixel is configured in a symmetrical structure, a part of the sampling area does not have a sub-pixel or sub-pixels. Therefore, upon a target brightness value of the sub-pixel being calculated in a following step, the sub-pixel can not borrow the brightness value of a sub-pixel in the part of sampling area without sub-pixels.

In another embodiment, the shape of a sampling area of any sub-pixel can be of a diamond. That is to say, for a sub-pixel, a sampling area of the sub-pixel is configured into a diamond. A center point of the diamond sampling area for any one sub-pixel coincides the center point of the sub-pixel while four apexes of the diamond sampling area are respectively center points of sub-pixels that meet requirements. The sub-pixels that meet requirements are those adjacent sub-pixels that are provided on a same row or on a same column and further of a same color as that of the sub-pixel.

Figure 4:
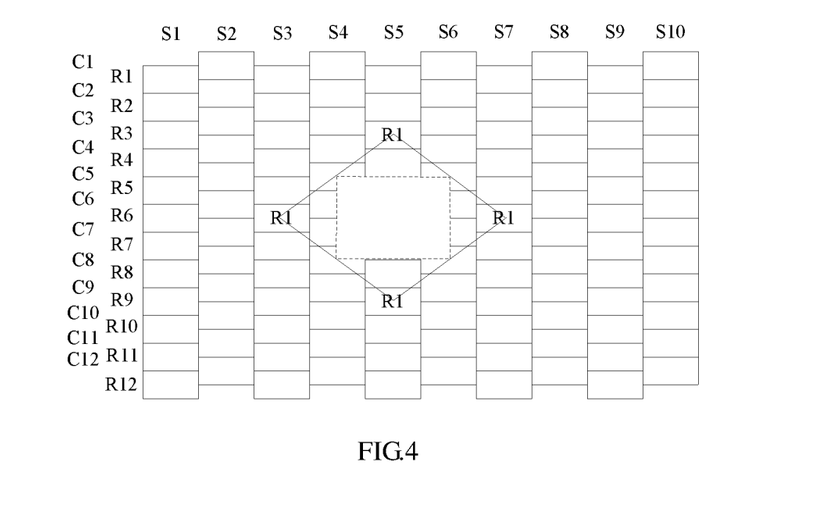
FIG. 4 is a schematic view of a sampling area provided in another embodiment of the present disclosure.

Taking the red sub-pixel at S5R6 position in a diamond sampling area illustrated in FIG. 4 as an example, the center point of the diamond sampling area for the red sub-pixel coincides the center point of the red sub-pixel, and four apexes of the diamond sampling area for the red sub-pixel are located respectively, at the center point of a red sub-pixel on S1R6 position, the center point of a red sub-pixel on S5R11 position, the center point of a red sub-pixel on S9R6 position and the center point of a red sub-pixel on S5R1 position. That is to say, in the embodiment, the sub-pixels meeting requirements are red sub-pixels respectively located at S1R6 position, S5R11 position, S9R6 position, and S5R1 position.

As for specific positions of sub-pixels meeting requirements, i.e., positions of specific apexes of a diamond sampling area, various choices can be made, and therefore, the embodiment of the present disclosure will not make any specific limit thereto.

For example, a sub-pixel meeting requirements can be such a sub-pixel with the least distance to this sub-pixel and among sub-pixels that are on a same row or same column and further of a same color as this sub-pixel. Still taking the red sub-pixel at S5R6 position in FIG. 4 as an example, positions of four apexes of a diamond area defined with solid line in FIG. 4 are sub-pixels with least distances to the sub-pixel and among the sub-pixels that are on a same row or same column and of a same color as the red sub-pixel at S5R6 position. Specifically, the center point of the diamond sampling area for this red sub-pixel coincides the center point of the red sub-pixel, and four apexes of the diamond sampling area for this red sub-pixel are located respectively at the center point of a red sub-pixel at S5R3 position, the center point of a red sub-pixel at S5R9 position, the center point of a red sub-pixel at S3R6 position, and the center point of a red sub-pixel at S7R6 position.

In this example, because the red sub-pixel at S5R3 position and the red sub-pixel at S5R9 position are located at symmetrical positions of the diamond while the red sub-pixel at S3R6 position and the red sub-pixel at S7R6 position are located at symmetrical positions of the diamond, and therefore, in selecting the weight of each sub-pixel, it is possible to allow the red sub-pixel at S5R3 position and the red sub-pixel at S5R9 position to have a same weight, and also allow the red sub-pixel at S3R6 position and the red sub-pixel at S7R6 position to have a same weight. In the case where the weight of each sub-pixel in a sampling area is determined in a following step, if the weight of the red sub-pixel at S5R3 position is determined, the weight of the red sub-pixel at S5R9 position can be determined accordingly; similarly, if the weight of the red sub-pixel at S3R6 position is determined, the weight of the red sub-pixel at S7R6 position can be determined accordingly; and hence the effect of reducing times to determine weights and simplifying calculation can be obtained.

In another embodiment, a sampling area of any sub-pixel can be a rectangular sampling area. The center point of the rectangular sampling area coincides the center point of the sub-pixel while four apexes of the rectangular sampling area are respectively midpoints of the sides of a preset diamond. The center point of the preset diamond coincides the center point of the sub-pixel and four apexes of the preset diamond are respectively center points of sub-pixels meeting requirements. Sub-pixels meeting requirements are sub-pixels that are on a same row or same column as the sub-pixel and further of a same color as that of the sub-pixel. Above descriptions regarding a diamond sampling area can be referred to for this preset diamond, and will not be redundantly repeated herein.

For example, if a sampling area of a sub-pixel is a rectangular sampling area, positions of four apexes of a preset diamond, to which the rectangular sampling area corresponds, can also be sub-pixels, with a least distance to the sub-pixel, among pixels that are on the same row or column as the sub-pixel and of a same color as the sub-pixel. Still taking a red sub-pixel at S5R6 position in FIG. 4 as an example, a rectangular area define by a dashed line can represent a schematic view for the structure of a rectangular sampling area. The center point of the rectangular sampling area for the red sub-pixel overlaps the center point of the red sub-pixel at S5R6 position. In determining four apexes for the red sub-pixel, a corresponding preset diamond should be determined first. The center point of the preset diamond overlaps the center point of the red sub-pixel, and four apexes of the preset diamond respectively are located at the center point of a red sub-pixel at S5R3 position, the center point of a red sub-pixel at S5R9 position, the center point of a red sub-pixel at S3R6 position, and the center point of a red sub-pixel at S7R6 position. In connection with the distribution of the apexes of the preset diamond, four apexes of the rectangular sampling area for the red sub-pixel at S5R6 position are respectively the midpoints of all the sides of the preset diamond. Referring to FIG. 4, four apexes of the red sub-pixel are respectively located at the center point of a red sub-pixel at S4C5 position, the center point of a red sub-pixel at S4C8 position, the center point of a red sub-pixel at S6C8 position and the center point of a red sub-pixel at S6C5 position.

Of course, if positions of four apexes of a preset diamond changes, positions of four apexes of a rectangular sampling area will also change, and the embodiments of the present disclosure do not specific limit the positions of four apexes of a rectangular sampling area.

Again referring to FIG. 3, the display method further include step 303: for any one sub-pixel, according to an original brightness value of the any one sub-pixel and original brightness values of sub-pixels in the sampling area of the any one sub-pixel, calculating a target brightness value of the any one sub-pixel.

According to the original brightness value of any sub-pixel and original brightness values of respective sub-pixels in the sampling area of the sub-pixel, calculating the target brightness value of the sub-pixel includes but not limited to the following implementation ways via step 1 and step 2:

Step 1: determining a weight of each sub-pixel that has a same color as any sub-pixel in a sampling area of the sub-pixel.

For example, if the sampling area of a sub-pixel includes four sub-pixels that have a same color as the sub-pixel, in determining a target brightness value of the sub-pixel, it is necessary to determine weights of the four sub-pixels that have a same color as the sub-pixel.

Step 2: calculating a target brightness value of the sub-pixel according to a weight and an original brightness value of each sub-pixel that has a same color as the sub-pixel in a sampling area of the sub-pixel.

Calculation of a target brightness value of the sub-pixel, according to a weight and an original brightness value of each sub-pixel that has a same color as the sub-pixel in a sampling area of the sub-pixel, can include but is not limited to following equation:

$$D = n_1 S_1 + n_2 S_2 + \ldots + n_m S_m$$

In the equation, D is a target brightness value of a sub-pixel, $S_1, S_2, \ldots S_m$ are original brightness values of respective sub-pixels, namely, $M1, M2, \ldots M_m$ that have the same color as the sub-pixel in the sampling area of the sub-pixel, and $n_1, n_2 \ldots n_m$ are respectively weights of $M1, M2, \ldots M_m$.

The sum of $n_1, n_2 \ldots n_m$ can be 1. $M1, M2, \ldots M_m$ can include the sub-pixel and can also be other sub-pixels that have the same color as the sub-pixel in the sampling area of the sub-pixel. That is to say, in calculating the target brightness value of sub-pixel, the sub-pixel itself may either take part in or not in this calculation. If the sub-pixel itself involves in the calculation, the weight of the sub-pixel can be set to be greater than the weight of other sub-pixels in the sampling area of the sub-pixel.

In order to explain the way of calculating a target brightness value of any sub-pixel, the arrange mode of a pixel array as illustrated in FIG. 1 will be taken as an example, with the sampling area of the any sub-pixel being a rectangular sampling area defined by a dashed line as in FIG. 4, steps of calculating a target brightness value of the any sub-pixel is explained in detail according to a weight and an original brightness value of each sub-pixel having the same color as that of the sub-pixel in the sampling area of the any sub-pixel. In an embodiment of the present disclosure, for a sub-pixel of a certain color in an odd column and a sub-pixel of a certain color in an even column, numbers and positions of sub-pixels with the same color in the sampling area of the sub-pixel are different, thus the method of calculating the target brightness value also become different. Hereinafter, in combination with FIG. 5 to FIG. 10, sub-pixels such as a red sub-pixel, a green sub-pixel and a blue sub-pixel in an odd column and sub-pixels such as a red sub-pixel, a green sub-pixel and a blue sub-pixel in an even column will be taken respectively as an example to explain.

Figure 5:
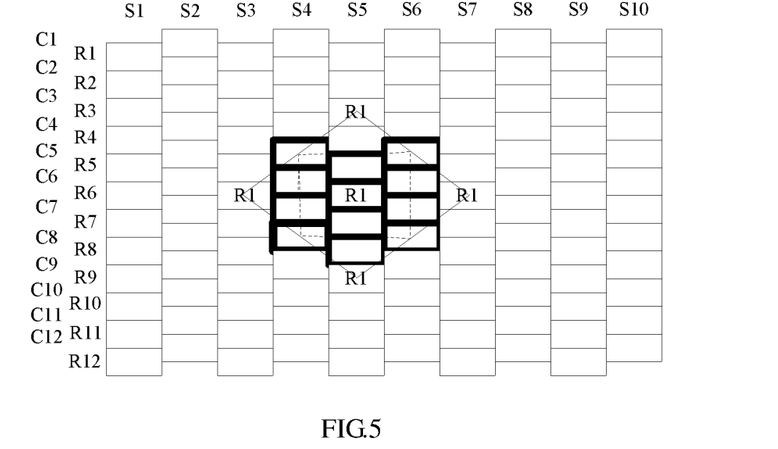
FIG. 5 is a schematic view of a sampling area of red sub-pixels in an odd column provided in another embodiment of the present disclosure.

In the sampling area of a red sub-pixel at S5R6 position as illustrated in FIG. 5, respective sub-pixels within the pixel included in the rectangular sampling area are sub-pixels that are represented by thick solid lines. Specifically, the sub-pixels in the rectangular sampling area include: a red sub-pixel at S4C5 position, a blue sub-pixel at S4C6 position, a green sub-pixel at S4C7 position, a red sub-pixel at S4C8 position, a green sub-pixel at S5R5 position, a red sub-pixel at S5R6 position, a blue sub-pixel at S5R7 position, a green sub-pixel at S5R8 position, a red sub-pixel at S6C5 position, a blue sub-pixel at S6C6 position, a green sub-pixel at S6C7 position and a red sub-pixel at S6C8 position. Red sub-pixels in these sub-pixels are respectively the sub-pixel at S4C5 position, a sub-pixel at S4C8 position, a sub-pixel at S5R6 position, a sub-pixel at S6C5 position and a sub-pixel at S6C8 position. A target brightness value of a red sub-pixel at S5R6 position is calculated according to a weight and an original brightness value of each of red sub-pixels respectively at S4C5 position, S4C8 position, S5R6 position, S6C5 position, and S6C8 position. Specifically, the weight of each of the red sub-pixels at the five positions is multiplied with the corresponding original brightness value of it to obtain five results, and then add the five results to get the target brightness value of the red sub-pixel at S5R6 position. In the embodiment, the red sub-pixel at S5R6 position being involved in calculation is taken as an example to explain; in another specific implementation, the red sub-pixel at S5R6 position may not involve in calculation either.

Figure 6:
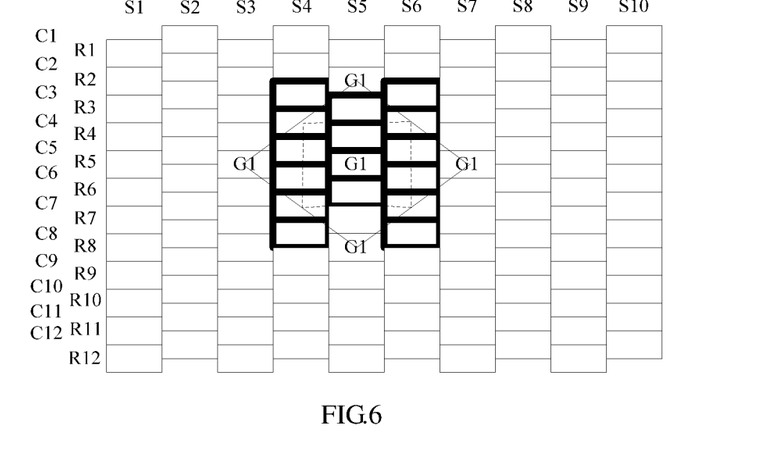
FIG. 6 is a schematic view of a sampling area of green sub-pixels in an odd column provided in another embodiment of the present disclosure.

In the sampling area of a green sub-pixel at S5R5 position as illustrated in FIG. 6, respective sub-pixels within the pixel included in the rectangular sampling area are sub-pixels that are represented by thick solid lines in FIG. 6. Specifically, sub-pixels in the rectangular sampling area include: a blue sub-pixel at S4C3 position, a green sub-pixel at S4C4 position, a red sub-pixel at S4C5 position, a blue sub-pixel at S4C6 position, a green sub-pixel at S4C7 position, a red sub-pixel at S4C8 position, a red sub-pixel at S5R3 position, a blue sub-pixel at S5R4 position, a green sub-pixel at S5R5 position, a red sub-pixel at S5R6 position, a blue sub-pixel at S6C3 position, a green sub-pixel at S6C4 position, a red sub-pixel at S6C5 position, a blue sub-pixel at S6C6 position, a green sub-pixel at S6C7 position, and a red sub-pixel at S6C8 position. Green sub-pixels in these sub-pixels are respectively a sub-pixel at S4C4 position, a sub-pixel at S4C7 position, a sub-pixel at S5R5 position, a sub-pixel at S6C4 position and a sub-pixel at S6C7 position. A target brightness value of a green sub-pixel at S5R5 position is calculated according to a weight and an original brightness value of each of green sub-pixels respectively at S4C4 position, S4C7 position, S5R5 position, S6C4 position, and S6C7 position. Specifically, the weight of each of the green sub-pixels at the five positions is multiplied with the corresponding original brightness value of it to get five results, and then add the five results to get the target brightness value of the green sub-pixel at S5R5 position. In the embodiment, the green sub-pixel at S5R5 position being involved in calculation is taken as an example to explain; in another specific implementation, the green sub-pixel at S5R5 position may not involve in the calculation either.

Figure 7:
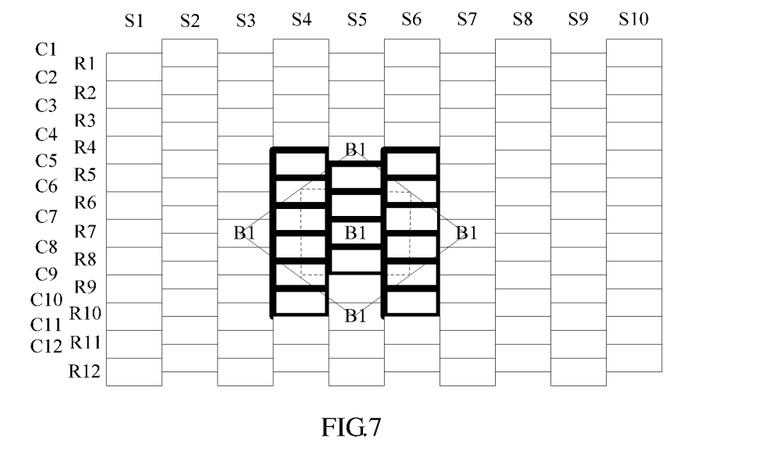
FIG. 7 is a schematic view of a sampling area of blue sub-pixels in an odd column provided in another embodiment of the present disclosure.

In the sampling area of a blue sub-pixel at S5R7 position as illustrated in FIG. 7, respective sub-pixels within the pixel included in the rectangular sampling area are sub-pixels that are represented by thick solid lines in FIG. 7. Specifically, sub-pixels in the rectangular sampling area include: a red sub-pixel at S4C5 position, a blue sub-pixel at S4C6 position, a green sub-pixel at S4C7 position, a red sub-pixel at S4C8 position, a blue sub-pixel at S4C9 position, a green sub-pixel at S4C10 position, a green sub-pixel at S5R5 position, a red sub-pixel at S5R6 position, a blue sub-pixel at S5R7 position, a green sub-pixel at S5R8 position, a red sub-pixel at S6C5 position, a blue sub-pixel at S6C6 position, a green sub-pixel at S6C7 position, and a red sub-pixel at S6C8 position, a blue sub-pixel at S6C9 position and a green sub-pixel at S6C10 position. Blue sub-pixels in these sub-pixels are respectively a sub-pixel at S4C6 position, a sub-pixel at S4C9 position, a sub-pixel at S5R7 position, a sub-pixel at S6C6 position and a sub-pixel at S6C9 position. A target brightness value of a blue sub-pixel at S5R7 position is calculated according to a weight and an original brightness value of each of blue sub-pixels respectively at S4C6 position, S4C9 position, S5R7 position, S6C6 position, and S6C9 position. Specifically, the weight of each of the blue sub-pixels at the five positions is multiplied with the corresponding original brightness value to get five results, and then add the five results to get the target brightness value of the blue sub-pixel at S5R7 position. In the embodiment, a blue sub-pixel on S5R7 position being involved in calculation is taken as an example to explain; in a specific implementation, the blue sub-pixel on S5R7 position may not involve in calculation either.

Figure 8:
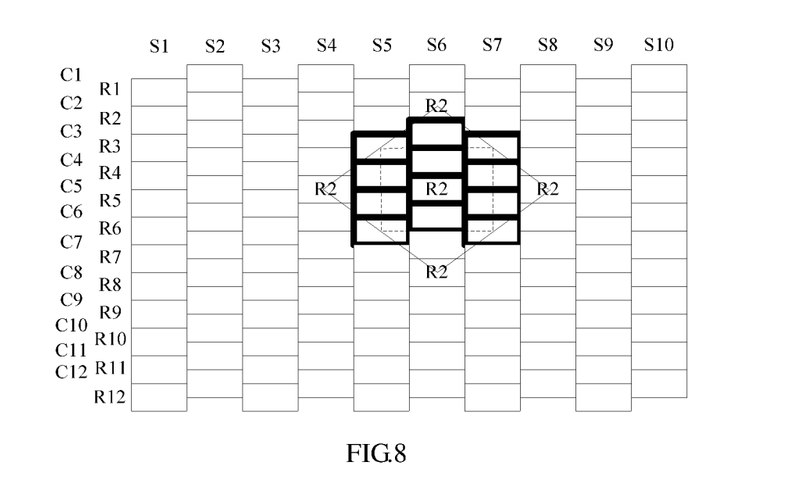
FIG. 8 is a schematic view of a sampling area of red sub-pixels in an even column provided in another embodiment of the present disclosure.

In the sampling area of a red sub-pixel at S6C5 position as illustrated in FIG. 8, respective sub-pixels within the pixel included in the rectangular sampling area are sub-pixels that are represented by thick solid lines in FIG. 8. Specifically, sub-pixels in the rectangular sampling area include: a red sub-pixel at S5R3 position, a blue sub-pixel at S5R4 position, a green sub-pixel at S5R5 position, a red sub-pixel at S5R6 position, a blue sub-pixel at S6C3 position, a green sub-pixel at S6C4 position, a red sub-pixel at S6C5 position, a blue sub-pixel at S6C6 position, a red sub-pixel at S7R3 position, a blue sub-pixel at S7R4 position, a green sub-pixel at S7R5 position, and a red sub-pixel at S7R6 position. Red sub-pixels in these sub-pixels are respectively a sub-pixel at S5R3 position, a sub-pixel at S5R6 position, a sub-pixel at S6C5 position, a sub-pixel at S7R3 position and a sub-pixel at S7R6 position. A target brightness value of a red sub-pixel on S6C5 position is calculated according to a weight and an original brightness value of each of red sub-pixels respectively at S5R3 position, S5R6 position, S6C5 position, S7R3 position, and S7R6 position. Specifically, the weight of each of the red sub-pixels at the five positions is multiplied with the corresponding original brightness value to get five results, and then add the five results to get the target brightness value of the red sub-pixel at S6C5 position. In the embodiment, a red sub-pixel at S6C5 position being involved in calculation is taken as an example to explain; in a specific implementation, the red sub-pixel at S6C5 position may not involve in calculation either.

Figure 9:
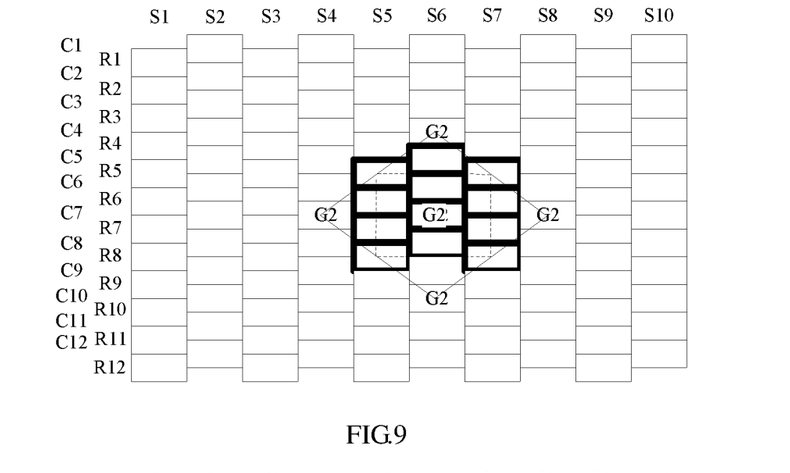
FIG. 9 is a schematic view of a sampling area of green sub-pixels in an even column provided in another embodiment of the present disclosure.

In the sampling area of a green sub-pixel at S6C7 position as illustrated in FIG. 9, respective sub-pixels within the pixel included in the rectangular sampling area are sub-pixels that are represented by thick solid lines in FIG. 9. Specifically, sub-pixels in the rectangular sampling area include: a green sub-pixel on S5R5 position, a red sub-pixel on S5R6 position, a blue sub-pixel on S5R7 position, a green sub-pixel on S5R8 position, a red sub-pixel on S6C5 position, a blue sub-pixel on S6C6 position, a green sub-pixel on S6C7 position, a red sub-pixel on S6C8 position, position, a green sub-pixel on S7R5 position, a red sub-pixel on S7R6 position, a blue sub-pixel on S7R7 position and a green sub-pixel on S7R8 position. Green sub-pixels in these sub-pixels are respectively a sub-pixel at S5R5 position, a sub-pixel at S5R8 position, a sub-pixel at S6C7 position, a sub-pixel at S7R5 position and a sub-pixel at S7R8 position. A target brightness value of a green sub-pixel at S6C7 position is calculated according to a weight and an original brightness value of each of green sub-pixels respectively at S5R5 position, S5R8 position, S6C7 position, S7R5 position, and S7R8 position. Specifically, the weight of each of the green sub-pixels on the five positions is multiplied with the corresponding original brightness value to get five results, and then add the five results to get the target brightness value of the green sub-pixel at S6C7 position. In the embodiment, a green sub-pixel at S6C7 position being involved in calculation is taken as an example to explain; in a specific implementation, the green sub-pixel on S6C7 position may not involve in calculation either.

Figure 10:
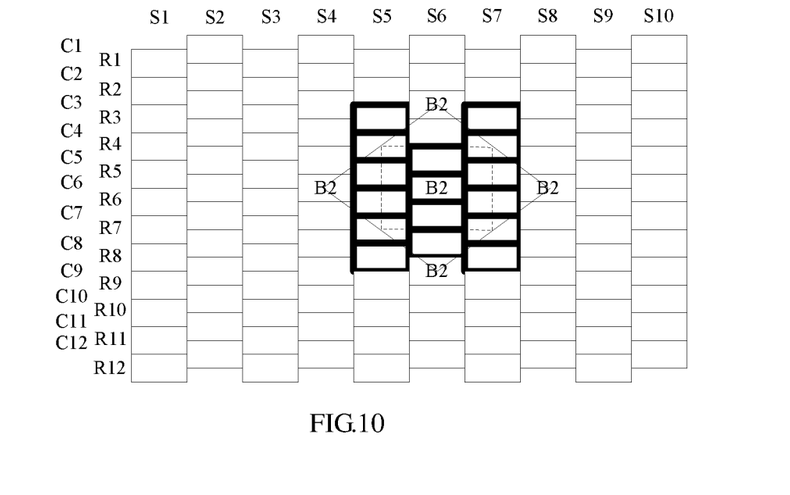
FIG. 10 is a schematic view of a sampling area of blue sub-pixels in an even column provided in another embodiment of the present disclosure.

In the sampling area of a blue sub-pixel on S6C6 position as illustrated in FIG. 10, respective sub-pixels within the pixel included in the rectangular sampling area are sub-pixels that are represented by thick solid lines in FIG. 10. Specifically, sub-pixels in the rectangular sampling area include: a red sub-pixel at S5R3 position, a blue sub-pixel at S5R4 position, a green sub-pixel at S5R5 position, a red sub-pixel at S5R6 position, a blue sub-pixel at S5R7 position, a green sub-pixel at S5R8 position, a red sub-pixel at S6C5 position, a blue sub-pixel at S6C6 position, a green sub-pixel at S6C7 position, a red sub-pixel at S6C8 position, a red sub-pixel at S7R3 position, a blue sub-pixel at S7R4 position, a green sub-pixel at S7R5 position, a red sub-pixel at S7R6 position, a blue sub-pixel at S7R7 position and a green sub-pixel at S7R8 position. Blue sub-pixels in these sub-pixels are respectively a sub-pixel at S5R4 position, a sub-pixel at S5R7 position, a sub-pixel at S6C6 position, a sub-pixel at S7R4 position and a sub-pixel at S7R7 position. A target brightness value of a blue sub-pixel on S6C6 position is calculated according to a weight and an original brightness value of each of blue sub-pixels respectively at S5R4 position, S5R7 position, S6C6 position, S7R4 position, and S7R7 position. Specifically, the weight of each of the blue sub-pixels at the five positions is multiplied with the corresponding original brightness value to get five results, and then add the five results to get the target brightness value of a blue sub-pixel at S6C6 position. In the embodiment, a blue sub-pixel at S6C6 position being involved in calculation is taken as an example to explain; in a specific implementation, the blue sub-pixel at S6C6 position may not involve in calculation either.

For example, in combination with the specific structure the above sampling area, the any sub-pixel may be a non-periphery sub-pixel. A non-periphery sub-pixel refers to a sub-pixel other than those located on a first row, a last row, a first column and a last column of a pixel array. Specifically, if sub-pixels are non-periphery pixels, the weight of each sub-pixel in a sampling area can be assigned easily so as to reduce the calculation workload in calculation of the target brightness value of each sub-pixel.

Again referring to FIG. 3, the display method further includes step 304: displaying an image to be displayed according to the target brightness value of each sub-pixel in a pixel array and dividing the displayed image into a plurality of views via a grating.

Specifically, after the target brightness of each sub-pixel in a pixel array is obtained by calculation, a drive circuit can be controlled to send a signal, which carries a target brightness value, to each sub-pixel to make the finally displayed brightness of each sub-pixel the same as its respective target brightness value.

Further, in order to make a displayed image present a 3D display effect, an image to be displayed can be divided into a plurality of views via a grating, and the plurality of views are controlled to be projected to different eyes of a user. For example, an image to be displayed can be divided into a left view and a right view via the light-blocking areas and the transparent areas of a grating; upon display being conducted, the left view and the right view are controlled to be projected respectively to the left eye and the right eye of a user to realize 3D display.

Dividing a displayed image into different views via a grating can be realized by adjusting the relationship between the grating and a pixel array. Specifically, the light-blocking areas and the transparent areas can be adjusted to make sub-pixels of odd columns in the pixel array correspond to the left view and sub-pixels of even columns in the pixel array correspond to the right view. Therefore, upon display being conducted according to target brightness values, the left view can be obtained by displaying according to the target brightness value of each sub-pixel in odd columns and the right view can be obtained by displaying according to the target brightness value of each sub-pixel in even columns.

Upon display being conducted according to the target brightness value of each sub-pixel, the target brightness value of each sub-pixel is jointly decided by the target brightness value of this sub-pixel and the original brightness value of each sub-pixel having a same color as that of this sub-pixel in its sampling area, and therefore, a higher resolution can be realized visually to increase PPI of a display device, so as to make an image to be displayed more explicit.

At least one the embodiment of the present disclosure provides a method, in which a display device that can realize a 3D display effect can be obtained through a combination of a pixel array of delta structure with a grating. Upon the display device being employed to display an image, for a sub-pixel, after calculating the target brightness value of this sub-pixel according to the original brightness value of this sub-pixel and each sub-pixel in the sampling area of this sub-pixel, an image is displayed according to the target brightness value of each sub-pixel; and the displayed image is divided into a plurality of views, so as to realize 3D display. Because in calculation of a target brightness value of a sub-pixel, this sub-pixel borrows original values of the other sub-pixels in its sampling area, upon display being conducted according to the target brightness value, the actual resolution of a display device is greater than the physical resolution of the display device, which can increase PPI of the display device, thus improving 3D display effect.

All the embodiments above can be combined in any way, which will not be specified anymore.

Those skilled in the art can understand that all or part of steps of the embodiments above can be realized by a hardware, and may also be realized by a program that gives instructions to a related hardware, the program can be stored in a readable storage media of a computer and the storage media can be read-only memory, a magnetic disc or an optical disc.

What are described above is related to the illustrative embodiments of the disclosure only and not limitative to the scope of the disclosure. The scopes of the disclosure are defined by the accompanying claims.

This application claims the benefit of Chinese patent application No. 201510117961.5 filed in China on Mar. 17, 2015, which is incorporated by reference herein as a part of this application.

The invention claimed is:

1. A display method applicable to a display device at least comprising a pixel array and a grating,
wherein the display method comprises:
   determining an original brightness of each sub-pixel in the pixel array according to an image to be displayed;
   obtaining a sampling area of each sub-pixel;
   for any one sub-pixel, calculating a target brightness value of the any one sub-pixel according to an original brightness value of the any one pixel and an original brightness value of each sub-pixel in a sampling area of the any one sub-pixel; and
   displaying the image according to a target brightness value of each sub-pixel in the pixel array and dividing the displayed image via a grating into a plurality of views;
   the sampling area of the any one sub-pixel is a rectangular sampling area, a center point of the rectangular sampling area overlaps a center point of the any one sub-pixel, and four vertexes of the rectangular sampling area respectively are midpoints of each side of a pre-set diamond;
   a center point of the preset diamond overlaps the center point of the sub-pixel and the four vertexes of the preset diamond are center points of sub-pixels meeting requirements, and the sub-pixels are those sub-pixels on a same row or column as the any one sub-pixel and having a same color as that of the any one sub-pixel;

the pixel array comprises a plurality of columns of pixels with each pixel comprising at least two sub-pixels;

each column of sub-pixels is formed by cyclically arranged sub-pixels of at least three colors, an amount of sub-pixels comprised in each column of sub-pixels is the same and a size of each sub-pixel is the same;

an upper edge of each sub-pixel in an odd column is aligned with that of a sub-pixel in another odd column, an upper edge of each sub-pixel in an even column is aligned with that of a sub-pixel in another even column, and a preset length of longitudinal offset between sub-pixels in odd columns and sub-pixels in even columns is provided, with the preset length being less than a longitudinal length of a sub-pixel;

all the sub-pixels in an odd column form a pixel column configured to display a first image, and all the sub-pixels in an even column form a pixel column configured to display a second image, wherein the first image and the second image are used to form a three dimensional image;

a length of longitudinal offset between an upper edge of the pixel column configured to display the first image and an upper edge of the pixel column configured to display the second image is equal to the preset length;

colors of any adjacent sub-pixels are different from each other; and the grating comprises light-blocking areas and transparent areas that are arranged alternately, with an orthographic projection of the light-blocking areas on the pixel array covering partial area of the pixel array.

2. The display method according to claim 1, wherein each of the pixels comprises two sub-pixels and each column of sub-pixels is formed by cyclic arrangement of a red sub-pixel, a green sub-pixel and, a blue sub-pixel.

3. The display method according to claim 1, wherein the preset length of longitudinal offset between sub-pixels of an odd column and sub-pixels of an even column is a half of longitudinal length of one sub-pixel.

4. The display method according to claim 1, wherein the light-blocking areas and the transparent areas of the grating are distributed in a vertical bar configuration.

5. The display method according to claim 1, wherein an orthographic projection of one of the light-blocking areas on the pixel array covers a left-half part of sub-pixels in an odd column and a right-half part of sub-pixels in an even column.

6. The method according to claim 1, wherein the sampling area of the any one sub-pixel is in a symmetrical structure.

7. The method according to claim 1, wherein the sub-pixels meeting requirements are those sub-pixels with a least distance to the any one sub-pixel in those sub-pixels that are on a same row or column as the any one sub-pixel and have a same color as the any one sub-pixel.

8. The display method according to claim 1, wherein calculating a target brightness value of the any one sub-pixel according to an original brightness value of the any one sub-pixel and an original brightness value of each sub-pixel in the sampling area of the any one sub-pixel, comprises: determining a weight of each sub-pixel that has a same color as that of the any one sub-pixel in the sampling area of the any one sub-pixel; and calculating the target brightness value of the any one sub-pixel according to the weight and the original brightness value of each sub-pixel that has a same color as that of the any one sub-pixel in the sampling area of the any one sub-pixel.

9. The display method according to claim 1, wherein the any one sub pixel is a non-periphery sub-pixel.

10. The display method according to claim 1, wherein each of the transparent areas of the grating extends along a column direction of the pixel array.

11. The display device method according to claim 1, wherein an orthographic projection of one of the light-blocking areas on the pixel array covers a right-half part of sub-pixels in all odd columns and a left-half part of sub-pixels in all even columns.

12. The method according to claim 1, wherein only one organic light-emitting diode is provided in each of the sub-pixels; and each column of sub-pixels is covered by an orthographic projection of only one of the light-blocking areas on the pixel array.

13. A display method applicable to a display device at least comprising a pixel array and a grating, wherein the display method comprises:

determining an original brightness of each sub-pixel in the pixel array according to an image to be displayed;

obtaining a sampling area of each sub-pixel;

for any one sub-pixel, calculating a target brightness value of the any one sub-pixel according to an original brightness value of the any one pixel and an original brightness value of each sub-pixel in a sampling area of the any one sub-pixel; and displaying the image according to a target brightness value of each sub-pixel in the pixel array and dividing the displayed image via a grating into a plurality of views;

the sampling area of the any one sub-pixel is a rectangular sampling area, a center point of the rectangular sampling area overlaps a center point of the any one sub-pixel, and four vertexes of the rectangular sampling area respectively are midpoints of each side of a pre-set diamond;

a center point of the preset diamond overlaps the center point of the sub-pixel and the four vertexes of the preset diamond are center points of sub-pixels meeting requirements, and the sub-pixels are those sub-pixels on a same row or column as the any one sub-pixel and having a same color as that of the any one sub-pixel;

the pixel array comprises a plurality of columns of pixels with each pixel comprising at least two sub-pixels;

each column of sub-pixels is formed by cyclically arranged sub-pixels of at least three colors, an amount of sub-pixels comprised in each column of sub-pixels is the same and a size of each sub-pixel is the same;

an upper edge of each sub-pixel in an odd column is aligned with that of a sub-pixel in another odd column, an upper edge of each sub-pixel in an even column is aligned with that of a sub-pixel in another even column, and a preset length of longitudinal offset between sub-pixels in odd columns and sub-pixels in even columns is provided, with the preset length being less than a longitudinal length of a sub-pixel;

the sub-pixels in an odd column form a pixel column configured to display a first image, and the sub-pixels in an even column form a pixel column configured to display a second image, wherein the first image and the second image are used to form a three dimensional image;

a length of longitudinal offset between an upper edge of the pixel column configured to display the first image and an upper edge of the pixel column configured to display the second image is equal to the preset length;

colors of any adjacent sub-pixels are different from each other;

the grating comprises light-blocking areas and transparent areas that are arranged alternately, with the light-blocking areas blocking partial area of the pixel array; and a ratio of a lateral length with respect to a longitudinal length in each sub-pixel is within 1:1 to 2:1.

14. A display method applicable to a display device at least comprising a pixel array and a grating, wherein the display method comprises:

determining an original brightness of each sub-pixel in the pixel array according to an image to be displayed;

obtaining a sampling area of each sub-pixel;

for any one sub-pixel, calculating a target brightness value of the any one sub-pixel according to an original brightness value of the any one pixel and an original brightness value of each sub-pixel in a sampling area of the any one sub-pixel; and displaying the image according to a target brightness value of each sub-pixel in the pixel array and dividing the displayed image via a grating into a plurality of views;

the sampling area of the any one sub-pixel is a rectangular sampling area, a center point of the rectangular sampling area overlaps a center point of the any one sub-pixel, and four vertexes of the rectangular sampling area respectively are midpoints of each side of a pre-set diamond;

a center point of the preset diamond overlaps the center point of the sub-pixel and the four vertexes of the preset diamond are center points of sub-pixels meeting requirements, and the sub-pixels are those sub-pixels on a same row or column as the any one sub-pixel and having a same color as that of the any one sub-pixel;

the pixel array comprises a plurality of columns of pixels with each pixel comprising at least two sub-pixels;

each column of sub-pixels is formed by cyclically arranged sub-pixels of at least three colors, an amount of sub-pixels comprised in each column of sub-pixels is the same and a size of each sub-pixel is the same;

an upper edge of each sub-pixel in an odd column is aligned with that of a sub-pixel in another odd column, an upper edge of each sub-pixel in an even column is aligned with that of a sub-pixel in another even column, and a preset length of longitudinal offset between sub-pixels in odd columns and sub-pixels in even columns is provided, with the preset length being less than a longitudinal length of a sub-pixel;

the sub-pixels in an odd column form a pixel column configured to display a first image, and the sub-pixels in an even column form a pixel column configured to display a second image, wherein the first image and the second image are used to form a three dimensional image;

a length of longitudinal offset between an upper edge of the pixel column configured to display the first image and an upper edge of the pixel column configured to display the second image is equal to the preset length;

colors of any adjacent sub-pixels are different from each other;

the grating comprises light-blocking areas and transparent areas that are arranged alternately, with the light-blocking areas blocking partial area of the pixel array; and a ratio of a lateral length with respect to a longitudinal length in each sub-pixel is 2:1.

* * * * *